(12) United States Patent
Shahbazmohamadi et al.

(10) Patent No.: US 9,818,383 B2
(45) Date of Patent: Nov. 14, 2017

(54) METHODS AND SYSTEMS FOR NON-DESTRUCTIVE ANALYSIS OF OBJECTS AND PRODUCTION OF REPLICA OBJECTS

(71) Applicant: University of Connecticut through its Center for Science & Technology Commercialization, Farmington, CT (US)

(72) Inventors: Sina Shahbazmohamadi, Riverdale, NY (US); Robert S. Howe, Wilbraham, MA (US); Richard Bass, Hampton, CT (US)

(73) Assignee: University of Connecticut, Farmington, CT (US)

( * ) Notice: Subject to any disclaimer, the term of this patent is extended or adjusted under 35 U.S.C. 154(b) by 144 days.

(21) Appl. No.: 14/811,114

(22) Filed: Jul. 28, 2015

(65) Prior Publication Data
US 2016/0025657 A1  Jan. 28, 2016

Related U.S. Application Data

(60) Provisional application No. 62/029,995, filed on Jul. 28, 2014.

(51) Int. Cl.
| | |
|---|---|
| *G01N 23/04* | (2006.01) |
| *G10D 9/02* | (2006.01) |
| *G06T 17/00* | (2006.01) |
| *G06T 19/20* | (2011.01) |
| *G10D 7/00* | (2006.01) |
| *B29C 67/00* | (2017.01) |

(Continued)

(52) U.S. Cl.
CPC ............ *G10D 9/02* (2013.01); *G06T 17/00* (2013.01); *G06T 19/20* (2013.01); *B29C 67/0088* (2013.01); *B33Y 50/02* (2014.12); *B33Y 80/00* (2014.12); *G06T 2210/41* (2013.01); *G06T 2219/2021* (2013.01); *G10D 7/005* (2013.01)

(58) Field of Classification Search
CPC ........... G01N 23/046; G01N 2223/419; G01N 15/088; G01N 2015/0846; G01N 2223/616; G01N 15/0227; G01N 15/08; G01N 1/06; G01N 23/223; G01N 1/28; A61B 6/482
See application file for complete search history.

(56) References Cited

FOREIGN PATENT DOCUMENTS

WO    WO 2013/063577 A1 *   2/2013

OTHER PUBLICATIONS

SkyScan, Application of CT scanning in industry, Daish Technological Institute, May 31, 2011.*

(Continued)

*Primary Examiner* — Hoon Song
(74) *Attorney, Agent, or Firm* — McDonnell Boehnen Hulbert & Berghoff LLP

(57) ABSTRACT

In one aspect, the present disclosure provides a method including rotating a rotatable surface with an object positioned thereon to a plurality of angular positions. The method also includes capturing, via an x-ray microtomography device at each of the plurality of angular positions, a tomograph of the object. The method also includes summing each tomograph of the object to create a three-dimensional image of the object. The method also includes using an additive manufacturing machine to create a three-dimensional replica of the object using the three-dimensional image of the object.

19 Claims, 10 Drawing Sheets

(51) Int. Cl.
B33Y 80/00 (2015.01)
B33Y 50/02 (2015.01)

(56) References Cited

OTHER PUBLICATIONS

Doubrovski et al., "Acoustic Investigation of Novel Saxophone Mouthpiece Designs Produced by Additive Manufacturing", Proceedings of TMCE (2012).
"Will 3D Printing Change the World?", Forbes Website, http://www.forbes.com/sites/gcaptain/2012/03/06/will-3d-printing-change-the-world/[Jul. 28, 2014 1:12:13 PM].

* cited by examiner

METHODS AND SYSTEMS FOR NON-DESTRUCTIVE ANALYSIS OF OBJECTS AND PRODUCTION OF REPLICA OBJECTS

CROSS-REFERENCE TO RELATED APPLICATIONS

This application claims the benefit of the filing date of U.S. Provisional Patent Application Ser. No. 62/029,995, filed Jul. 28, 2014, which is hereby incorporated by reference in its entirety.

BACKGROUND

The traditional method of replication of antique wind instruments and similar objects takes a material and shapes it to the dimensions of the original object. Such objects are traditionally measured by calipers. Reamers and drills are created from the measurements and raw materials are fashioned into a replica of the object using these tools. This process requires a highly-trained craftsman, is very time-consuming and has the potential to damage the instrument being copied. Further, such a process introduces small, but potentially cumulative errors at each step of the replication process. All of this makes the process expensive and limits production.

The disclosure contained herein is in the general field of systems for detailed and sophisticated analysis of the structure, construction and materials of various objects, such as period instruments. Disclosed herein are methods for non-destructive analysis and replication of period musical instruments and parts using an x-ray microtomography device and additive manufacture methods. Although the discussion herein focuses on the non-destructive analysis and replication of period musical instruments, these methods are equally applicable to the non-destructive analysis and replication of almost any three-dimensional object.

SUMMARY OF THE INVENTION

In one aspect, the present disclosure provides a method including rotating a rotatable surface with an object positioned thereon to a plurality of angular positions, capturing, via an x-ray microtomography device at each of the plurality of angular positions, a tomograph of the object, and summing each tomograph of the object to create a three-dimensional image of the object.

In another aspect, the present disclosure provides another method including rotating a rotatable surface with an object positioned thereon to a plurality of angular positions, capturing, via an x-ray microtomography device at each of the plurality of angular positions, a tomograph of the object using a first voltage and a first power, summing each tomograph of the object from the first voltage and the first power to create a first three-dimensional image of the object, capturing, via the x-ray microtomography device at each of the plurality of angular positions, a tomograph of the object using a second voltage and a second power, summing each tomograph of the object from the second voltage and the second power to create a second three-dimensional image of the object, and combining the first three-dimensional image of the object with the second three-dimensional image of the object to create a final three-dimensional image of the object.

In yet another embodiment, the present disclosure provides a system, the system comprising (i) an x-ray microtomography device, (ii) a rotatable surface positioned adjacent to the x-ray microtomography device, (iii) at least one processor, and (iv) data storage including program instructions stored thereon that when executed by the at least one processor, cause the system to: (a) rotate the rotatable surface to a plurality of angular positions, (b) capture, via the x-ray microtomography device at each of the plurality of angular positions, a tomograph of an object, and (c) sum each tomograph of the object to create a three-dimensional image of the object.

These as well as other aspects, advantages, and alternatives, will become apparent to those of ordinary skill in the art by reading the following detailed description, with reference where appropriate to the accompanying drawings.

DETAILED DESCRIPTION

Figure 1:
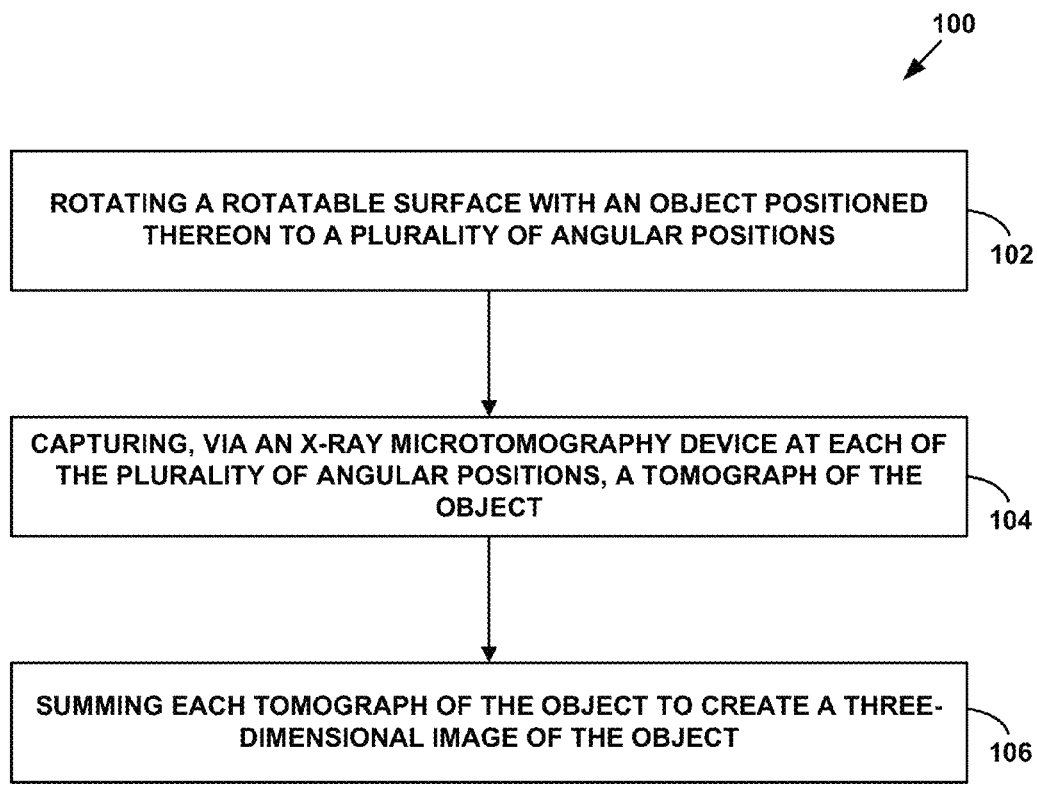
FIG. 1 is a block diagram of an example method of the invention.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

In one aspect, the present disclosure provides a method including rotating a rotatable surface with an object positioned thereon to a plurality of angular positions, capturing, via an x-ray microtomography device at each of the plurality of angular positions, a tomograph of the object, and summing each tomograph of the object to create a three-dimensional image of the object. The methods of the invention can, for example, minimize or eliminate damage to original objects (including, but not limited, to fragile objects such as musical instruments) that are used to create models, and does not have the inherent errors that can occur in taking measurements by hand and translating them to the necessary tooling.

The described methods and systems do not simply use generic or proposed data to create new versions of instruments using additive manufacturing, but instead apply data derived from micro-CT analysis of a specific object, such as an antique object to produce a replica. In addition, the disclosed methods and systems can be applied to a situation where information on instruments design comes from or is estimated from photographs, product catalogs, original drawings of engineers or craftspersons, or scale drawings.

Therefore, it is an object of the disclosed methods and systems to provide the opportunity to investigate the internal construction of antique instruments, how they were created and how they sounded.

Additionally, it is an object of the disclosed methods and systems to remove the need for taking measurements and making tools, thus eliminating errors inherent in traditional processes.

Further, it is an object of the disclosed methods and systems to decrease the need to use scarce wood species in the crafting of instruments.

Further, it is an object of the disclosed methods and systems to provide the ability to correct any damage or inappropriate repairs incurred over time to antique instruments and historic objects.

Further, it is an object of the disclosed methods and systems to permit production of unlimited numbers of replicas. Further, it is an object of the disclosed methods and systems to permit production copies of instruments at larger and smaller scales for the re-creation of antique musical instruments.

Further, it is an object of the disclosed methods and systems to be used to authenticate questionable specimens, i.e., to detect counterfeit reproductions of genuine period instruments and objects.

Further, it is an object of the disclosed methods and systems to identify and "map" areas of the instruments having different types of wood, wooden pins and other elements of construction, and/or having different orientations (with respect to direction of wood grain with respect to the "long axis" of the instrument or part).

Referring now to the figures, FIG. 1 is a block diagram of an example method 100 of the invention. The method shown in FIG. 1 presents an embodiment of a method that could be used by one or more of the systems described herein. The example method 100 may include one or more operations, functions, or actions as illustrated by the blocks in FIG. 1. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method and other processes and methods disclosed herein, each block in FIG. 1 may represent circuitry that is wired to perform the specific logical functions in the process.

Initially, at block 102, the method 100 includes rotating a rotatable surface with an object positioned thereon to a plurality of angular positions. In one example, the object may be positioned in a non-metallic material, and the non-metallic material may be fixed to the rotatable surface. As such, when the rotatable surface rotates, the object also rotates. Such a non-metallic material is x-ray transparent, so that only the object is displayed when a tomograph of the object is created. In one example, the non-metallic material may be a polystyrene foam. In another example, the non-metallic material may be cork. Other materials are possible as well. As the rotatable surface rotates about an axis, the rotatable surface rotates to a plurality of angular positions with respect to the axis. In one particular example, the plurality of angular positions comprise a range of between about 250 angular positions and about 1,000 angular positions.

At block 104, the method 100 continues with capturing, via an x-ray microtomography device at each of the plurality of angular positions, a tomograph of the object. Computed tomography uses x-rays to create cross-sections of a three-dimensional object, thus producing a virtual model without touching the original, as in a medical "CT scan." The data that create this digital model are expressed as pixels. The term micro indicates that the pixel sizes of these scans are in the micrometer range (one-thousandth of a millimeter), thus permitting extremely fine measurements. With appropriate analytic software, μCT permits sophisticated reconstruction and viewing of specimens as if from infinite points of view, which is of great value in analyzing fragile, complex objects such as antique instruments and parts.

In one example, each tomograph of the object is captured via the x-ray microtomography device at a voltage in the range of about 55 kV to about 75 kV, and a power in the range of about 5 Watts to about 6 Watts. Further, each tomograph of the object may be captured via the x-ray microtomography device at an x-ray transmission value in the range of about 40% to about 85%, although other ranges are possible as well.

At block 106, the method 100 continues with summing each tomograph of the object to create a three-dimensional image of the object. The common practice of micro-CT requires the X-ray transmission of 20-35% to yield the best result. Such values cannot be achieved when dealing with some parts of musical instruments as they are comprised of both highly X-ray attenuating materials such as silver and low density materials such as wood that are almost X-ray transparent. In one example, in order to overcome this challenge, higher x-ray energy is used to eliminate artifacts that occur due the presence of high density materials. This increases transmission rate in the wooden areas up to 80-90% at some low density areas. However, by applying image processing on the X-ray projection, both wooden and metallic parts are detected. In cases where wood was located inside a metallic tube, the object may be imaged using two different energy levels and by subtracting the metallic portion of the image, wooden parts were successfully imaged.

Another challenge associated with performing micro-CT on musical instruments is the sample's size. Though the exact numbers may differ from one instrument to another, the field of view (FOV) of an x-ray microtomograph device is always limited and the height and width of the objects to be imaged cannot exceed several centimeters. The FOV is inversely related to the resolution, that is, higher resolutions can result in much smaller window size. A resolution of 10-20 microns may be preferable, which is well within the range of best tolerance of manufacturing mouthpieces or three-dimensional printing technologies. This resolution dictates that the mouthpieces are too large to be fit into a single scan.

One proposed remedy is to use multiple scanning sessions, obtaining images of different locations of the mouthpiece and then using stitching algorithms to integrate the multiple scans. However, there are some inevitable movements between the two imaging sessions which negated the possibility of using basic conventional image stitching algorithms. FIGS. 2A-2B illustrate the results of multiple imaging of a saxophone mouthpiece where the images obtained by two tomography scans are not aligned.

Figure 2C:
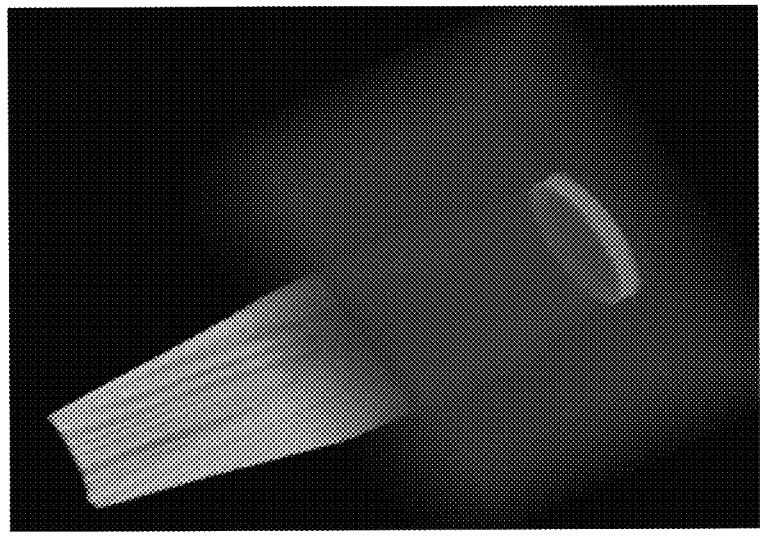
FIG. 2C illustrates a three-dimensional rendered image of an object with the artifacts imposed because of multiple scans with different grayscale values.
Figure 2B:
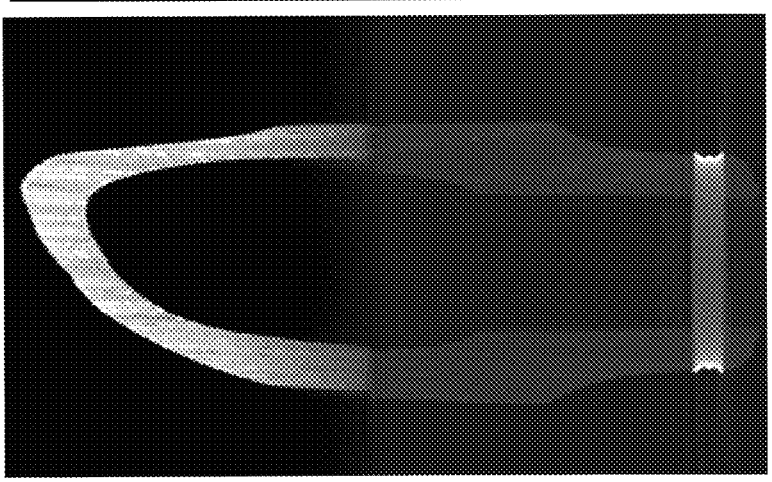
FIGS. 2A-2B illustrate the results of multiple imaging of an object where the images are not aligned.
Figure 2A:
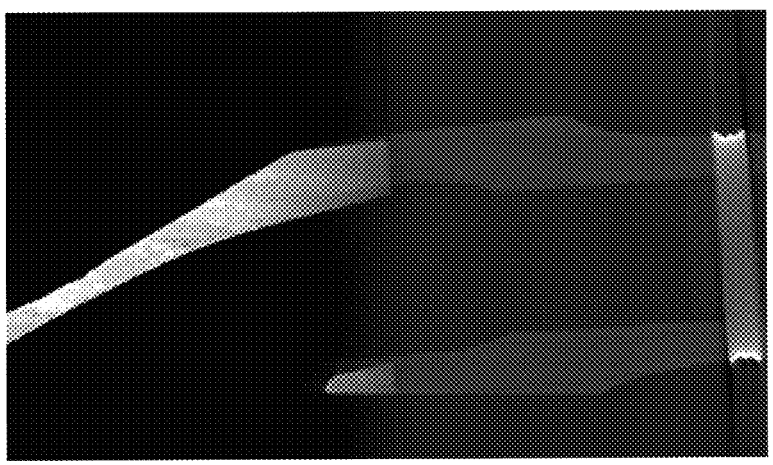

There are two issues with the images shown in FIG. 2A-2C. First, the scans are not well aligned, with the top portion of the mouthpiece translated and rotated. Second, there is a false gray scale variation between the two portions while in reality there is no material variation between the two portions. In order to rectify this problem, an image processing step is introduced, which, regardless of the x-ray instrument or the nature of images, can be used to combine images of multiple scans extending the possibility of imaging to much bigger samples.

Figure 2F:
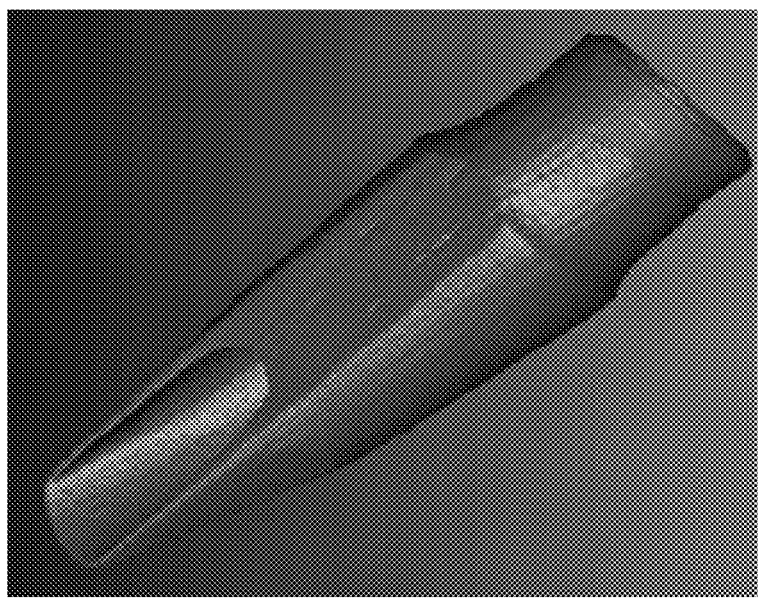
FIG. 2F illustrates an after processing three-dimensional rendered image of an object.
Figure 2E:
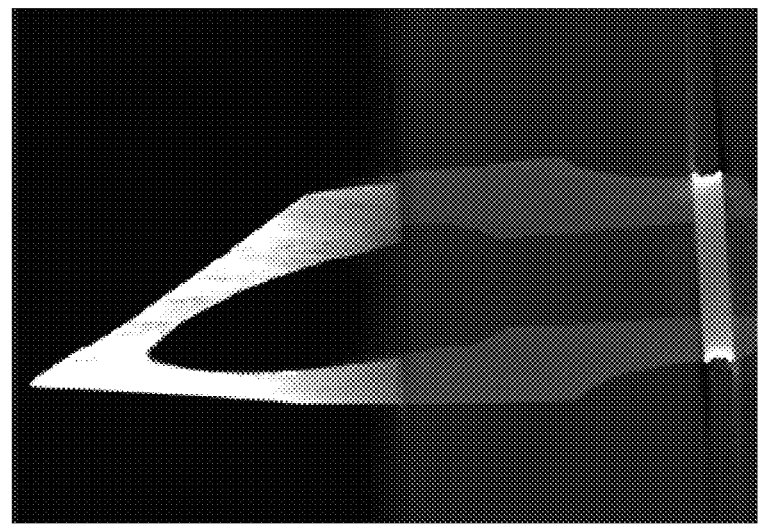
FIG. 2E illustrates a before processing imaging of an object where the images are not aligned.
Figure 2D:
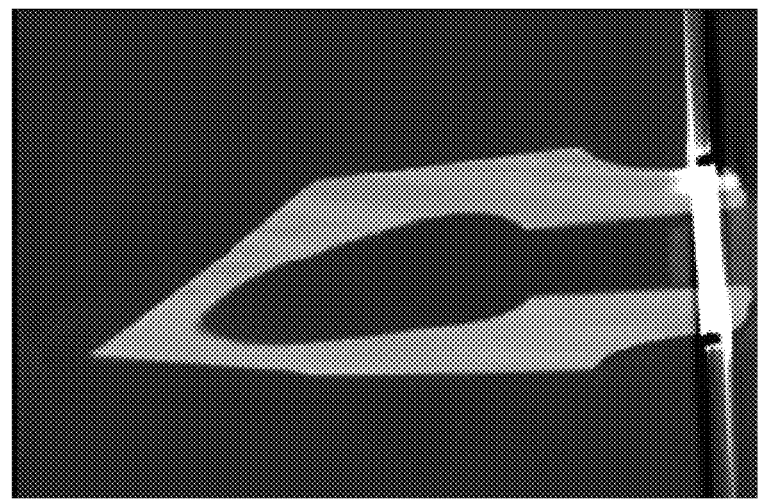
FIG. 2D illustrates an after processing imaging of an object.

In the image processing step, each three-dimensional image is transformed into a surface using the process called segmentation, where materials are assigned to each pixel. Following obtaining the surfaces, a surface alignment algorithm is performed where an optimizer searches for the best affine transformation (combination of rotation, translation and scaling) to align same features. A 10-20% of overlap between the images is maintained so there is enough three-dimensional information for alignment. The optimizer will automatically stop when the features are within acceptable tolerance (e.g., RMS<0.001). However, in order to make sure that the difference in intensity won't influence the result of optimization and also the images won't contain false grayscale discrepancy, the grayscale of images are normalized and reconstructed using the same global minimum and maximum grayscale values. These results are performed on all 2D images automatically making the three-dimensional rendering of the entire piece free of any artifacts. The results of such processing are shown in FIGS. 2D-2F.

Three-dimensional x-ray images are large (file size can be as large 10 Gigabytes), therefore image processing algorithms must be selected cautiously to reduce the computational cost. Also, due to beam hardening, (which is false change in grey scale value of image within a same material happening due to x-ray losing its energy as it passes through the sample especially for large samples), it is difficult to segment (assign materials to pixel gray scale values) the images so the images have to smoothed prior to segmentation. Therefore, an isotropic diffusion filter may be used. This filter is able to preserve hard edges but denoises the sample from beam hardening effects. The diffusion equation is:

$$\frac{\partial \phi(r,t)}{\partial t} = \nabla \cdot [D(\phi, r)\nabla \phi(r,t)], \qquad (1)$$

where $\phi$ the image at time t and D is the diffusion function. The discretized form of this function will be:

$$\phi @ t+1 = \phi @ t + \frac{dt}{c}\sum_{n=1}^{6} D_n \nabla \phi @ t * N_n, \qquad (2)$$

where the index n denotes the voxel's face number, N is the normal and c is the side of one voxel.

The discretization can be done in space as well. The Diffusion function is also normalized to U where it takes the value of $U_n = D_n/D_0$ to be zero or 1·the value $$\frac{dt}{c} * D_0$$

is also kept constant at ⅙ to ensure system's stability. The resulting equation is:

$$\phi @ t+1_{x,y,z} == \qquad (3)$$
$$\phi @ t \left(1 - \frac{1}{6}\sum_{n=1}^{6} U_n\right) + 1/6(U_1 \phi @ t_{x-1,y,z} + U_1 \phi @ t_{x+1,y,z} +$$
$$U_1 \phi @ t_{x,y-1,z} + U_1 \phi @ t_{x,y+1,z} + U_1 \phi @ t_{x,y,z-1} + U_1 \phi @ t_{x,y,z+1})$$

$U_n$ is function of the difference between the current voxel and its neighbors. $U_n$ is defined by: $U_n=1$ if the value is smaller than threshold and it is zero otherwise. The threshold is chosen based on the difference seen at the edges and is chosen on a case by case basis. Based on this equation, diffusion between neighboring pixels is done unless the value exceeds the threshold (that is the pixel belongs to an edge). Following this smoothing algorithm the segmentation is done using thresholding where an interval of grayscale value would be assigned to materials.

The next step is to compute surface from the segmented images to make a triangulated surface. Creating too many triangles makes the file size very large, therefore probability information is created based on the above work to create smoother surfaces. Once the surfaces are created, they can be either three-dimensional (3D) printed as is or imported to advanced CAD software to be reverse engineered, as discussed below, or otherwise modified prior to 3D printing.

In one example, the method 100 may further continue with causing an additive manufacturing machine to create a three-dimensional replica of the object using the three-dimensional image of the object. Additive manufacturing, known colloquially as "3D photocopying" or "3D printing", is a technique by which digital images are transformed into layers of data. These data layers are then turned into sheets of plastic or metal or other materials that are fused and laser-polished to achieve exceedingly fine tolerances, less than 0.01 mm. Additive manufacturing enables a user to make highly accurate copies of original musical instrument (or similar objects) while avoiding the errors and potential damage associated with handling, examining and hand measuring the original musical instrument parts themselves. As used herein, "additive manufacturing" may include alternative methods of automated construction including computer numerical control ("CNC") milling, CNC routing, or other similar processes. A given software application may be used to assign a material to each pixel, a process known as "Image Segmentation". After the segmentation, a Computer Aided Design (CAD) model of the part may be created using the surface generation module of the software.

The CAD file, in the form of an STL file for example, may then be imported to an additive manufacturing device. Several parameters may be optimized to enhance the quality of the duplicated parts. First, the additive manufacturing may be performed using the highest density plastic material available for replication of musical instruments, since low density options may produce no sound due to lack of sufficient mass. Also, the printing orientation may be chosen to yield better polished surfaces on the inside. In particular, models may be oriented on their side and printed from the bottom up with precisely deposited layers of modeling and support material. The support material is a transient material for printing holes and grooves.

In some examples, the additive manufacturing machine may replicate graining of wood especially on some finished surfaces. Further, the additive manufacturing machine may use material for replication of instruments so that all sections of the instrument or part are isodense with the original instrument, so much as the density pattern of the original can be ascertained. In addition, "fibers" and other materials that provide directional/orientation dependent characteristics maybe be added during additive manufacturing production to mimic the graining of wood in original instruments. Further still, one may add one or more layers on the outside of an instrument or part to replicate the properties of the instrument or part that are impacted by varnishes, resins and other finishing materials.

Figure 3:
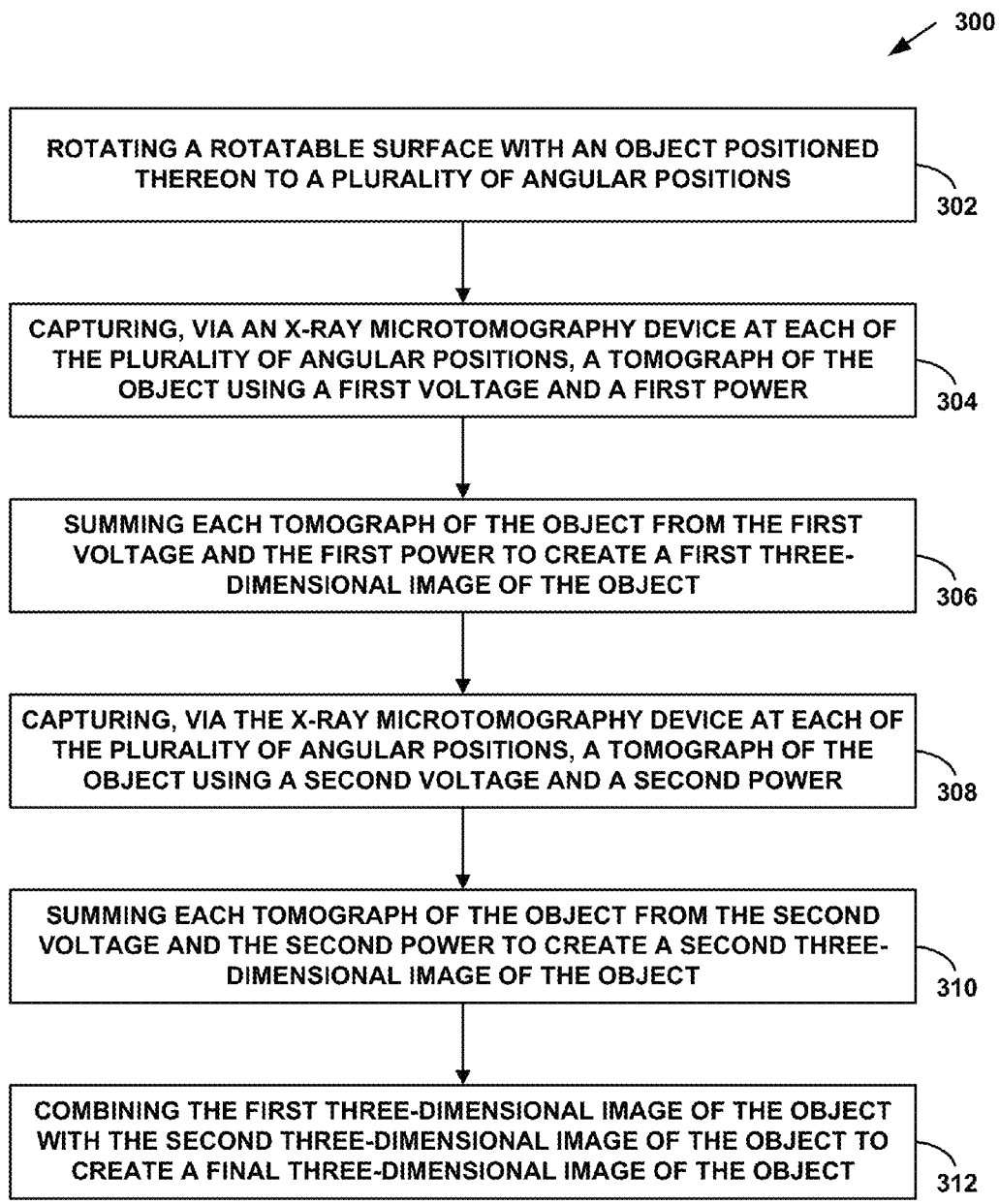
FIG. 3 is a block diagram of another example method of the invention.

FIG. 3 is a block diagram of another example method 300 of the invention. Method 300 may include one or more operations, functions, or actions as illustrated by one or more of blocks 302-314. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Initially, at block 302, the method 300 includes rotating a rotatable surface with an object positioned thereon to a plurality of angular positions, as discussed above in relation to block 102 of method 100. At block 304, the method 300 continues with capturing, via an x-ray microtomography device at each of the plurality of angular positions, a tomograph of the object using a first voltage and a first power. In one example, the first voltage is in the range of about 55 kV to about 75 kV, and the first power is in the range of about 5 Watts to about 6 Watts.

At block 306, the method 300 continues with summing each tomograph of the object from the first voltage and the first power to create a first three-dimensional image of the object, as discussed above in relation to block 106 of method 100.

At block 308, the method 300 continues with capturing, via the x-ray microtomography device at each of the plurality of angular positions, a tomograph of the object using a second voltage and a second power. The second voltage may be greater than the first voltage, and the second power may be greater than the first power. In one example, the second voltage is in the range of about 90 kV to about 140 kV, and the second power is in the range of about 7 Watts to about 10 Watts.

At block 310, the method 300 continues with summing each tomograph of the object from the second voltage and the second power to create a second three-dimensional image of the object, as discussed above in relation to block 106 of method 100.

At block 312, the method 300 continues with combining the first three-dimensional image of the object with the second three-dimensional image of the object to create a final three-dimensional image of the object. In one example, combining the first three-dimensional image of the object with the second three-dimensional image of the object to create the final three-dimensional image comprises capturing the first three dimensional image and the second three dimensional images such that there is about 10% to about 20% of overlap between the images, and aligning the first three-dimensional image of the object and the second three-dimensional image of the object, using the overlap between the images, to create a final three-dimensional image of the object.

Figure 4B:
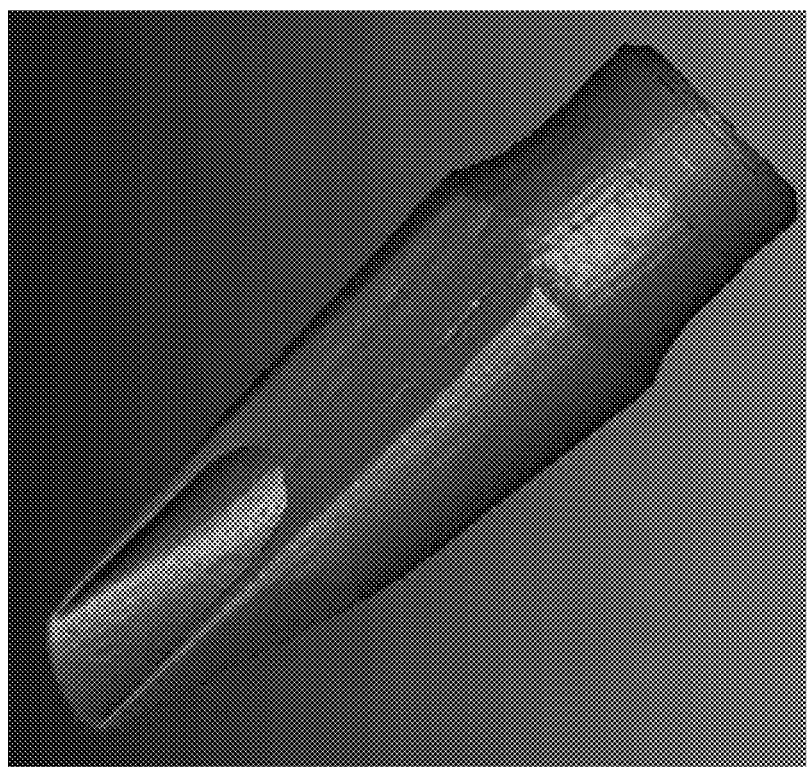
FIG. 4B illustrates an after processing three-dimensional rendered image of an object.
Figure 4A:
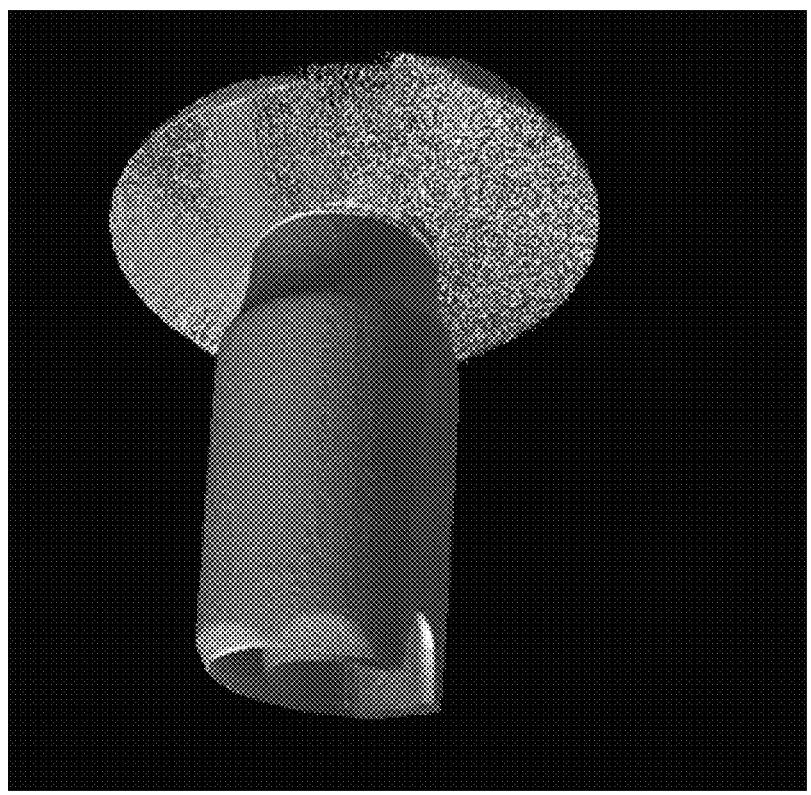
FIG. 4A illustrates a three-dimensional rendering of an object with an artifact resulting from a high-density material in the object.

Such a method is advantageous to overcome a major challenge in imaging some musical instruments or parts such as mouthpieces, where the challenge is the presence of high Z materials such as metals and low Z wood at the same time. In the case of the mouth piece shown in FIGS. 4A-4B, there is a ring in bottom portion of the mouthpiece which has created an artifact. The major challenge is what x-ray energy has to be used. Using very high energy allows the x-rays to penetrate into metal but removes the artifact seen in FIG. 2D. However, as wood is a low Z material, use of high energy causes all the x-rays to penetrate creating a ~100% transmission value, making the wooden portion invisible for the tomography. On the other hand, if imaged at low energy, the x-rays cannot penetrate into metal creating artifacts as the one seen in FIG. 2D (a two-dimensional representation) and FIG. 4A (a three-dimensional representation). In order to rectify this issue, two scans are performed as discussed above in relation to blocks 404 and 408. One scan is performed with high energy only to capture the bottom ring and then multiple imaging is performed with a low energy to capture the information on the wooden parts. Similar strategies can be applied to other musical instruments or parts that are made of both low Z and high Z materials. FIG. 4A shows the image of the bottom portion at low energy, while FIG. 4B illustrates the entire part after the integration of the data of both scans using dual energy and multiple stitching. The image in FIG. 4B has the same grayscale at all wooden locations, the images of the two scans have been aligned; and the ring has been imaged free from any artifacts.

In one example, the method 300 may continue with causing an additive manufacturing machine to create a three-dimensional replica of the object using the final three-dimensional image of the object, as discussed above.

Many antique musical instruments and parts have experienced damage through time and have dents, cracks, holes or delamination and other imperfections. Therefore an exact replica might not be playable or may have sound quality issues or simply not fit in the original instrument. Therefore, it may be advantageous to remove the imperfections from the three-dimensional image of the object prior to creating the three-dimensional replica by using image processing and geometric modeling of surfaces.

Figure 5A:
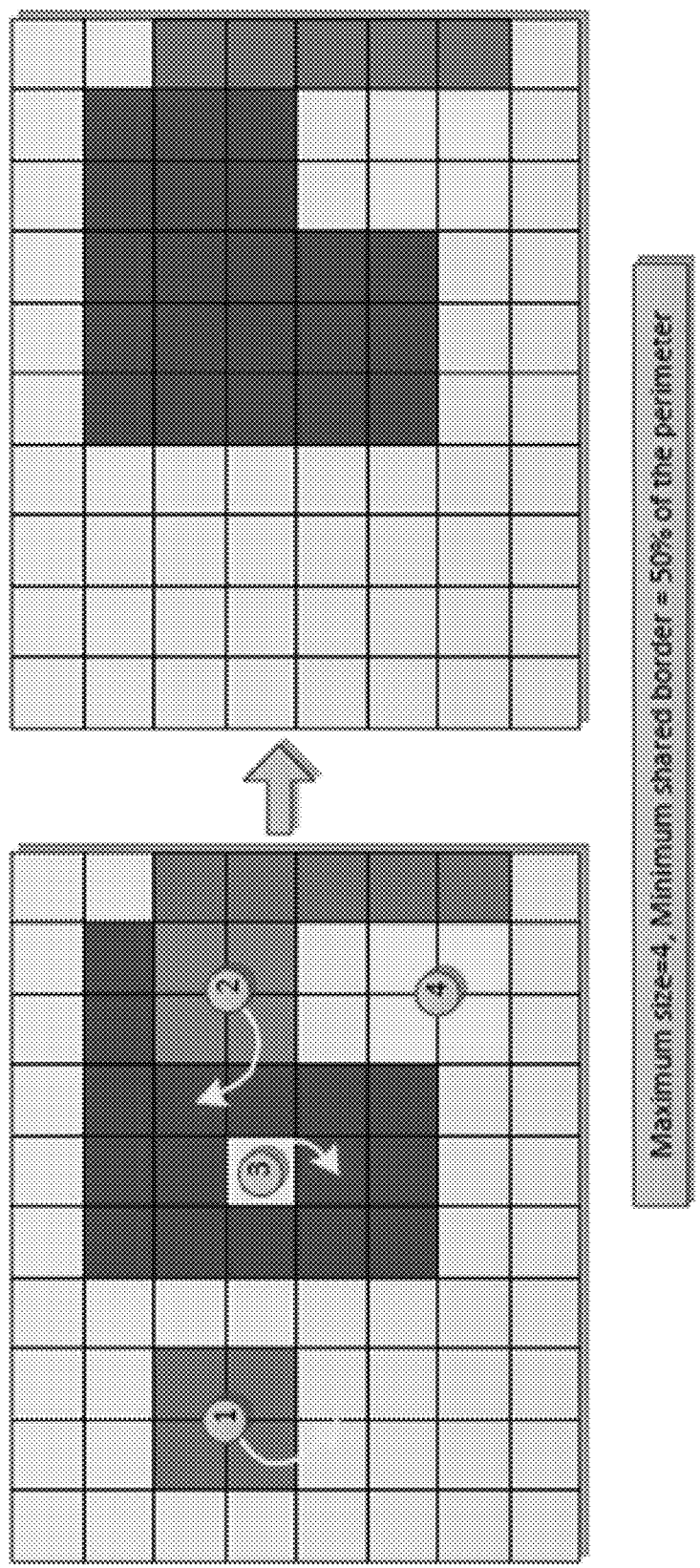
FIG. 5A illustrates a mechanism for removing imperfections from a three-dimensional image of an object.

One or more algorithms may be used to remove or rectify the demonstrated defects. First, in order to remove cracks in an image a removing island image processing algorithm is utilized. An island may be defined as a connected area containing a number of voxels less than or equal to the maximum size value that can be specified in addition to a special processing for n-neighbors islands. In this case, if an n-neighbors island is encountered, the neighbor with the largest border that is not the exterior is identified. Let A be this neighbor. If the length of the border with A is greater than a minimum length, the region is assigned to A, otherwise the region remains untouched. FIG. 5A illustrates the mechanism of the removing island algorithm.

Figures 5B, 5C:
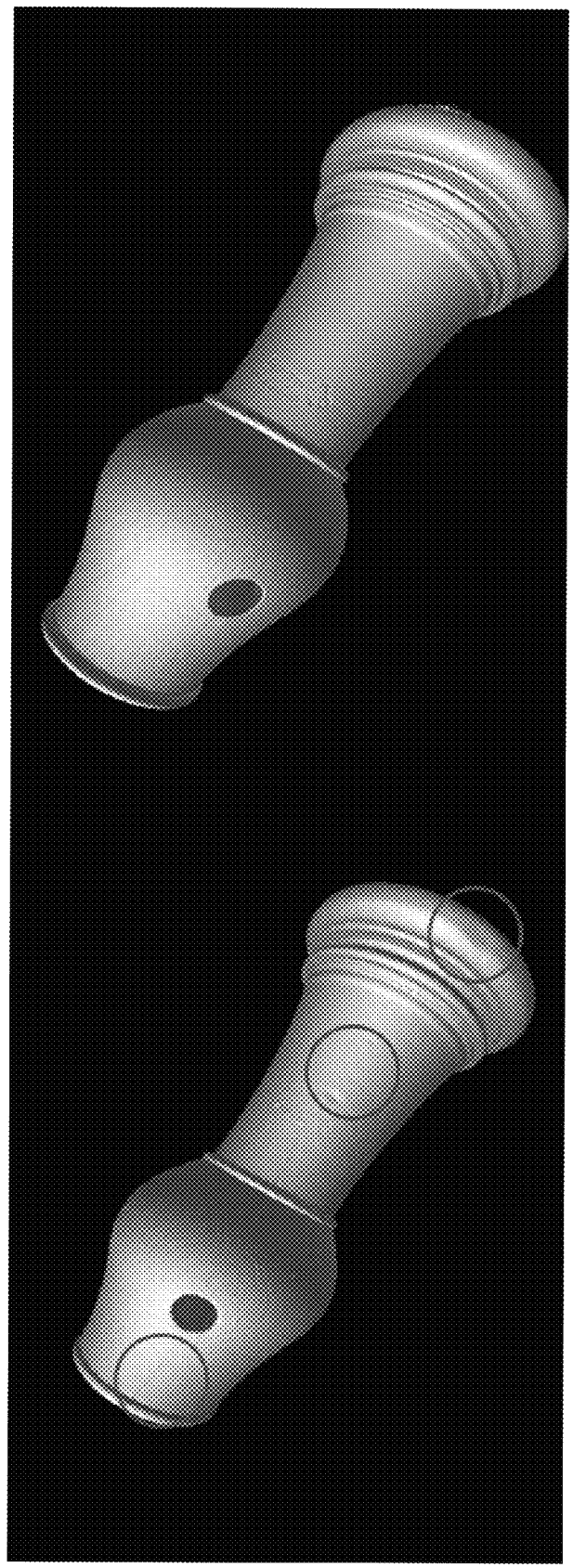
FIG. 5B illustrates before processing of a rendered three-dimensional image of an object.
FIG. 5C illustrates after processing of a rendered three-dimensional image of an object.

In addition, using geometric modeling of the areas where a dent has been identified, the geometry has been rectified to ideal geometry. As can be seen in the set of images in FIG. 5B, there are multiple issues including cracks and delamination in the x-ray scan of the original part shown at different sectional views and in the rendered three-dimensional image which has been highlighted using red circles and ellipses. FIG. 5C shows the results of these modifications in the rendered three-dimensional image. The rectified three-dimensional images can then be converted to CAD models, or other three-dimensional models, for creating a defect free replica, as discussed above.

Figure 6:
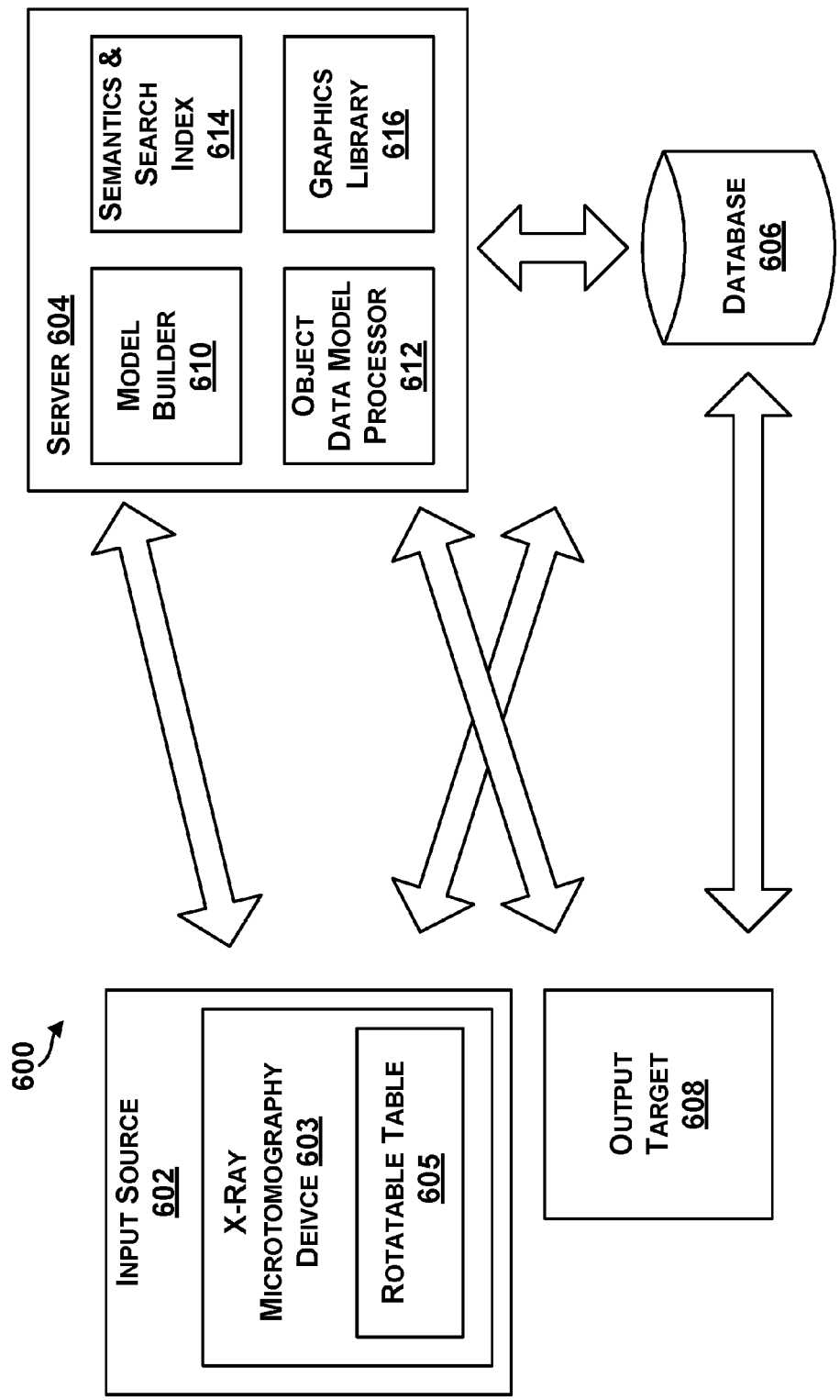
FIG. 6 illustrates an example system for non-destructive analysis of objects.

FIG. 6 illustrates an example system 600 for non-destructive analysis of objects. The system 600 may be used to perform the methods described above in relation to FIGS. 1 and 3, for example. The system 600 includes an input source 602 coupled to a server 604 and a database 606. The server 604 is also shown coupled to the database 606 and an output target 608. The system 600 may include more or fewer components, and each of the input source 602, the server 604, the database 606, and the output target 608 may comprise multiple elements as well, or each of the input source 602, the server 604, the database 606, and the output target 608 may be interconnected as well. Thus, one or more of the described functions of the system 600 may be divided up into additional functional or physical components, or combined into fewer functional or physical components. In some further examples, additional functional and/or physical components may be added to the examples illustrated by FIG. 6.

Components of the system 600 may be coupled to or configured to be capable of communicating via a network (not shown), such as a local area network (LAN), wide area network (WAN), wireless network (Wi-Fi), or Internet, for example. In addition, any of the components of the system 600 may be coupled to each other using wired or wireless communications. For example, communication links between the input source 602 and the server 604 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 602 may be, for example an x-ray microtomograph device 603 as discussed above. The x-ray microtomograph device 603 may include a rotatable table 605, on which an object may be positioned. As the rotatable table 605 rotates, the x-ray microtomograph device 603 may capture a plurality of tomographs of the object.

The server 604 includes a model builder 610, an object data model processor 612, a semantics and search index 614, and a graphics library 616. Any of the components of the server 604 may be coupled to each other. In addition, any components of the server 604 may alternatively be a separate component coupled to the server 604. The server 604 may further include a processor and memory including instructions executable by the processor to perform functions of the components of the server 604, for example.

The model builder 610 receives the tomograph data set for the object from the input source 602, and may generate a three-dimensional model of the object.

The object data model processor 612 may also receive the tomograph data set for the object from the input source 602 and render the three-dimensional image for display. Texture map generation can also be performed to determine color texture for map rendering. Texture map generation may include using the mesh data sets (H) that have colors but no ultraviolet (UV) unwrapping to generate a mesh (D) with UV unwrapping but no colors. As an example, for a single output texture pixel of an image processing may include, for a given point in UV determine a triangle in the mesh's UV mapping (D), and using triangle-local coordinates, move to an associated three-dimensional point on the mesh. A bidirectional ray may be cast along the triangle's normal to intersect with the mesh (H), and color, normal and displacement may be used for an output. To generate an entire texture image, each pixel in the image can be processed.

The semantics and search index 614 may receive captured tomographs or processed tomographs that have been decimated and compressed, and may perform texture resampling and also shape-based indexing. For example, for each object, the semantics and search index 614 may index or label components of the images (e.g., per pixel) as having a certain texture, color, shape, geometry, attribute, etc.

The graphics library 616 may include a WebGL or OpenGL mesh compression to reduce a mesh file size, for example. The graphics library 616 may provide the three-dimensional object data model in a form for display on a browser, for example. In some examples, a three-dimensional object data model viewer may be used to display images of the three-dimensional objects data models. The three-dimensional object data model viewer may be implemented using WebGL within a web browser, or OpenGL, for example.

The database 606 may store all data sets for a three-dimensional object data model in any number of various forms from raw data captured to processed data for display.

The output target 608 may include a number of different targets, such as an additive manufacturing machine, CNC milling machine, or the like.

In examples herein, the system 700 may be used to acquire data of an object, process the data to generate a three-dimensional object data model, and create a three-dimensional replica of the object using an additive manufacturing machine, as discussed above.

Figure 7:
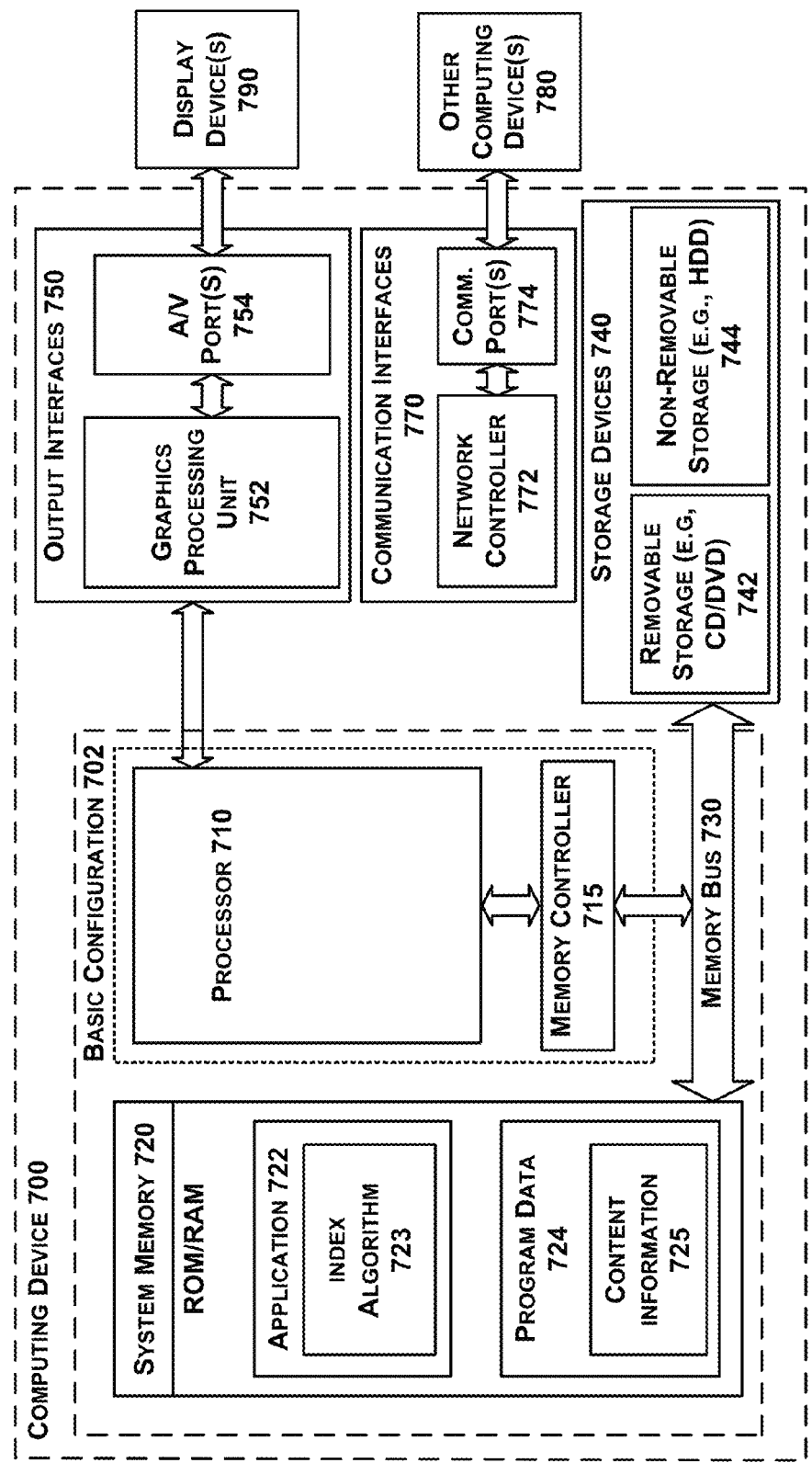
FIG. 7 is a functional block diagram illustrating an example computing device used in a computing system that is arranged in accordance with at least some embodiments described herein.

FIG. 7 is a functional block diagram illustrating an example computing device used in a computing system that is arranged in accordance with at least some embodiments described herein. The computing device may be a personal computer, mobile device, cellular phone, touch-sensitive wristwatch, tablet computer, video game system, or global positioning system, and may be implemented to provide a system for non-destructive analysis of objects and production of replica objects as described in FIGS. 1-5C. In a basic configuration 702, computing device 700 may typically include one or more processors 710 and system memory 720. A memory bus 730 can be used for communicating between the processor 710 and the system memory 720. Depending on the desired configuration, processor 710 can be of any type including but not limited to a microprocessor (μP), a microcontroller (μC), a digital signal processor (DSP), or any combination thereof. A memory controller 715 can also be used with the processor 710, or in some implementations, the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof. System memory 720 may include one or more applications 722, and program data 724. Application 722 may include an index algorithm 723 that is arranged to provide inputs to the electronic circuits, in accordance with the present disclosure. Program data 724 may include content information 725 that could be directed to any number of types of data. In some example embodiments, application 722 can be arranged to operate with program data 724 on an operating system.

Computing device 700 can have additional features or functionality, and additional interfaces to facilitate communications between the basic configuration 702 and any devices and interfaces. For example, data storage devices 740 can be provided including removable storage devices 742, non-removable storage devices 744, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 720 and storage devices 740 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of device 700.

Computing device 700 can also include output interfaces 750 that may include a graphics processing unit 752, which can be configured to communicate to various external devices such as display devices 790 or speakers via one or more A/V ports 754 or a communication interface 770. The communication interface 770 may include a network controller 772, which can be arranged to facilitate communications with one or more other computing devices 780 over a network communication via one or more communication ports 774. In one example, the other computing device 780 may include an additive manufacturing machine. The communication connection is one example of communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 700 can be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 700 can also be implemented as a personal computer including both laptop computer and non-laptop computer configurations.

Figure 8:
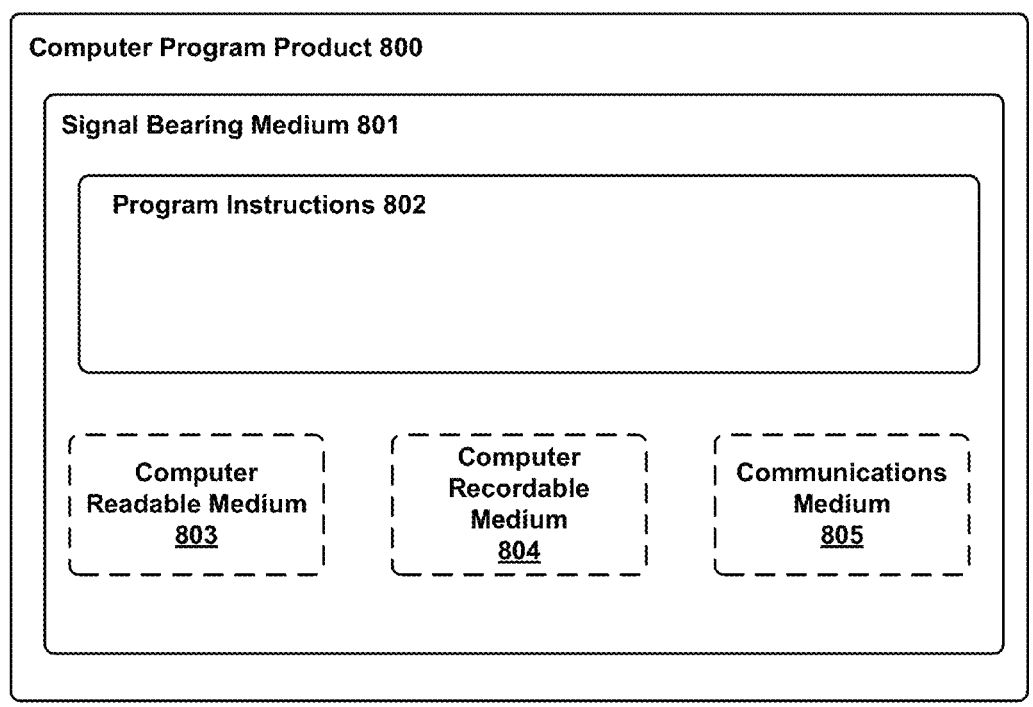
FIG. 8 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a non-transitory computer-readable storage media in a machine-readable format, or on other non-transitory media or articles of manufacture. FIG. 8 is a schematic illustrating a conceptual partial view of an example computer program product that includes a computer program for executing a computer process on a computing device, arranged according to at least some embodiments presented herein.

In one embodiment, the example computer program product 800 is provided using a signal bearing medium 801. The signal bearing medium 801 may include one or more instructions 802 that, when executed by one or more processors may provide functionality or portions of the functionality described above with respect to FIGS. 1-5C In some examples, the signal bearing medium 801 may encompass a computer-readable medium 803, such as, but not limited to, a hard disk drive, a Compact Disc (CD), a Digital Video Disk (DVD), a digital tape, memory, etc. In some implementations, the signal bearing medium 801 may encompass a computer recordable medium 804, such as, but not limited to, memory, read/write (R/W) CDs, R/W DVDs, etc. In some implementations, the signal bearing medium 801 may encompass a communications medium 805, such as, but not limited to, a digital and/or an analog communication medium (e.g., a fiber optic cable, a waveguide, a wired communications link, a wireless communication link, etc.). Thus, for example, the signal bearing medium 801 may be conveyed by a wireless form of the communications medium 805 (e.g., a wireless communications medium conforming with the IEEE 802.11 standard or other transmission protocol).

The one or more program instructions 802 may be, for example, computer executable and/or logic implemented instructions. In some examples, a computing device such as the computing device 700 of FIG. 7 may be configured to provide various operations, functions, or actions in response to the program instructions 802 conveyed to the computing device 800 by one or more of the computer readable medium 803, the computer recordable medium 804, and/or the communications medium 805.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described examples, it is intended that all matters in the preceding description and shown in the accompanying figures be interpreted as illustrative and not in a limiting sense.

We claim:

1. A method comprising:
   rotating a rotatable surface with an object positioned thereon to a plurality of angular positions;
   capturing, via an x-ray microtomography device at each of the plurality of angular positions, a tomograph of a first portion of the object;
   summing each tomograph of the first portion of the object to create a three-dimensional image of the first portion of the object;
   rotating the rotatable surface with the object positioned thereon to the plurality of angular positions;
   capturing, via the x-ray microtomography device at each of the plurality of angular positions, a tomograph of a second portion of the object;
   summing each tomograph of the second portion of the object to create a three-dimensional image of the second portion of the object, wherein there is about 10% to about 20% of overlap between the three-dimensional image of the first portion of the object and the three-dimensional image of the second portion of the object; and
   aligning the three-dimensional image of the first portion of the object and the three-dimensional image of the second portion of the object, using the overlap, to create a final three-dimensional image of the object.

2. The method of claim 1, wherein the plurality of angular positions comprise a range between about 250 angular positions and about 1,000 angular positions.

3. The method of claim 1, further comprising:
   determining, based on the final three-dimensional image of the object, one or more imperfections in the object; and
   removing the one or more imperfections from the final three-dimensional image of the object prior to creating a three-dimensional replica, such that the three-dimensional replica of the object does not include the one or more imperfections.

4. The method of claim 3, wherein the one or more imperfections comprise at least one of a dent, a scratch, or a crack in the object.

5. The method of claim 1, wherein each tomograph of the object is captured via the x-ray microtomography device at a voltage in the range of about 55 kV to about 75 kV and a power in the range of about 5 Watts to about 6 Watts.

6. The method of claim 1, wherein each tomograph of the object is captured via the x-ray microtomography device at an x-ray transmission value in the range of about 40% to about 85%.

7. The method of claim 1, wherein the object is reversibly attached to a non-metallic material, wherein the non-metallic material is fixed to the rotatable surface.

8. The method of claim 1, further comprising:
   causing an additive manufacturing machine to create a three-dimensional replica of the object using the final three-dimensional image of the object wherein the object comprises a period musical instrument.

9. A method comprising:
   rotating a rotatable surface with an object positioned thereon to a plurality of angular positions;
   capturing, via an x-ray microtomography device at each of the plurality of angular positions, a tomograph of the object using a first voltage and a first power;
   summing each tomograph of the object from the first voltage and the first power to create a first three-dimensional image of the object;
   capturing, via the x-ray microtomography device at each of the plurality of angular positions, a tomograph of the object using a second voltage and a second power;
   summing each tomograph of the object from the second voltage and the second power to create a second three-dimensional image of the object, wherein there is about 10% to about 20% of overlap between the first three-dimensional image of the object and the second three-dimensional image of the object; and
   aligning the first three-dimensional image of the object and the second three-dimensional image of the object, using the overlap between the images, to create a final three-dimensional image of the object.

10. The method of claim 9, wherein the first voltage is different than the second voltage, and wherein the first power is different than the second power.

11. The method of claim 10, wherein the first voltage is in the range of about 55 kV to about 75 kV and the first power is in the range of about 5 Watts to about 6 Watts, and wherein the second voltage is in the range of about 90 to about 140 kV and the second power is in the range of about 7 Watts to about 10 Watts.

12. The method of claim 9, further comprising:
    determining, based on the final three-dimensional image of the object, one or more imperfections in the object; and
    removing the one or more imperfections from the final three-dimensional image of the object prior to creating a three-dimensional replica, such that the three-dimensional replica of the object does not include the one or more imperfections.

13. The method of claim 9, wherein the plurality of angular positions comprise a range between about 250 angular positions and about 1,000 angular positions.

14. The method of claim 9, further comprising:

causing an additive manufacturing machine to create a three-dimensional replica of the object using the final three-dimensional image of the object.

15. A system comprising:

an x-ray microtomography device;

a rotatable surface positioned adjacent to the x-ray microtomography device;

at least one processor; and data storage including program instructions stored thereon that when executed by the at least one processor, cause the system to:

rotate the rotatable surface to a plurality of angular positions;

capture, via the x-ray microtomography device at each of the plurality of angular positions, a tomograph of a first portion of an object;

sum each tomograph of the object to create a three-dimensional image of the first portion of the object;

rotate the rotatable surface with the object positioned thereon to the plurality of angular positions;

capture, via the x-ray microtomography device at each of the plurality of angular positions, a tomograph of a second portion of the object;

sum each tomograph of the second portion of the object to create a three-dimensional image of the second portion of the object, wherein there is about 10% to about 20% of overlap between the three-dimensional image of the first portion of the object and the three-dimensional image of the second portion of the object; and align the three-dimensional image of the first portion of the object and the three-dimensional image of the second portion of the object, using the overlap, to create a final three-dimensional image of the object.

16. The system of claim 15, wherein the program instructions are further executable by the at least one processor to cause the system to:

capture the tomograph of the object at an x-ray transmission value in the range of about 40% to about 85%.

17. The system of claim 15, wherein the program instructions are further executable by the at least one processor to cause the system to:

rotate the rotatable surface to between about 250 angular positions and about 1,000 angular positions.

18. The system of claim 15, wherein the program instructions are further executable by the at least one processor to cause the system to:

determine, based on the final three-dimensional image of the object, one or more imperfections in the object; and remove the one or more imperfections from the final three-dimensional image of the object prior to creating a three-dimensional replica of the object, such that the three-dimensional replica of the object does not include the one or more imperfections.

19. The system of claim 15, further comprising an additive manufacturing machine, wherein the program instructions are further executable by the at least one processor to cause the system to:

cause the additive manufacturing machine to create a three-dimensional replica of the object using the final three-dimensional image of the object.

\* \* \* \* \*